United States Patent
Shenoi

(10) Patent No.: US 6,829,292 B1
(45) Date of Patent: Dec. 7, 2004

(54) INCREASING GAIN WITH ISOLATING UPSTREAM AND DOWNSTREAM FILTERS AND AMPLIFIERS

(75) Inventor: Kishan Shenoi, Saratoga, CA (US)

(73) Assignee: Symmetricom, Inc., San Jose, CA (US)

( * ) Notice: Subject to any disclaimer, the term of this patent is extended or adjusted under 35 U.S.C. 154(b) by 0 days.

(21) Appl. No.: 09/476,770

(22) Filed: Jan. 3, 2000

(51) Int. Cl.$^7$ ............................................... H04B 3/36
(52) U.S. Cl. ...................... 375/211; 375/213; 375/220; 375/221; 379/343
(58) Field of Search ................................ 375/211, 213, 375/219, 220, 221, 222; 379/343

(56) References Cited

U.S. PATENT DOCUMENTS

| | | | |
|---|---|---|---|
| 3,843,844 A | | 10/1974 | Schumperli ............... 179/16 F |
| 4,131,766 A | | 12/1978 | Narasimha .............. 179/15 FD |
| 4,237,551 A | | 12/1980 | Narasimha ................... 370/50 |
| 4,939,747 A | * | 7/1990 | Adler .......................... 375/213 |
| 5,095,528 A | | 3/1992 | Leslie et al. .................. 455/10 |
| 5,627,501 A | | 5/1997 | Biran et al. ................ 333/17.1 |
| 5,751,716 A | * | 5/1998 | Tzannes et al. ............. 370/468 |
| 5,790,174 A | | 8/1998 | Richard, III et al. ........... 348/7 |
| 5,883,941 A | | 3/1999 | Akers ...................... 379/93.08 |
| 5,956,323 A | | 9/1999 | Bowie ......................... 370/241 |
| 5,978,373 A | | 11/1999 | Hoff et al. ................... 370/392 |
| 5,999,542 A | | 12/1999 | Turner et al. ............... 370/497 |
| 6,029,048 A | | 2/2000 | Treatch ......................... 455/7 |
| 6,118,766 A | | 9/2000 | Akers ......................... 370/249 |
| 6,130,882 A | | 10/2000 | Levin ......................... 370/252 |
| 6,141,330 A | | 10/2000 | Akers ......................... 370/264 |
| 6,151,691 A | * | 11/2000 | Pesetski et al. ............. 714/713 |
| 6,236,664 B1 | * | 5/2001 | Erreygers .................... 370/492 |
| 6,262,972 B1 | * | 7/2001 | McGinn et al. ............. 370/210 |
| 6,459,684 B1 | * | 10/2002 | Conroy et al. .............. 370/286 |
| 2002/0141569 A1 | * | 10/2002 | Norrell et al. .............. 379/377 |

FOREIGN PATENT DOCUMENTS

| | | |
|---|---|---|
| GB | 2 337 380 A | 11/1999 |
| KR | 0065094 | 8/1999 |
| WO | WO 98/44757 | 10/1998 |

OTHER PUBLICATIONS

Wang et al., "Automatic gain control VLSI architecture for ADSL–1 cap system," *Journal of the Chinese Institute of Electrical Engineering.*, pp 261–268, 1996.

"HomePortal™ 1000: Bringing the power of DSL Home," *2Wire, Inc.* brochure, 1999.

"Analog front end for ADSL extends linearity and local–loop length," Article from the *END magazine* web site at: www.ednmag.com, Jan. 21, 1999.

"DSL is coming!DSL is coming!," Article from the *Teleconnect* web site at: www.teleconnect.com, Sep. 5, 2000.

"Communications companies stay ahead of the curve," Article from the *NetWorkFusion* web site at: www.nwfusion.com, Dec. 18, 2000.

(List continued on next page.)

*Primary Examiner*—Khai Tran
*Assistant Examiner*—David B. Lugo
(74) *Attorney, Agent, or Firm*—John Bruckner PC

(57) ABSTRACT

Systems and methods are described for digital subscriber loop repeaters. A method of transforming a digital subscriber loop signals includes increasing a gain with a digital subscriber loop repeater including: isolating an upstream signal band by passing an upstream signal through an upstream pass filter; amplifying the isolated upstream signal with an upstream amplifier; isolating a downstream signal band by passing a downstream signal through a downstream pass filter; and amplifying the isolated downstream signal with a downstream amplifier. The systems and methods provide advantages because DSL can be provided over long loops and/or over coil loaded loops.

8 Claims, 3 Drawing Sheets

OTHER PUBLICATIONS

"Microfilter design promises peaceful coexistence between ADSL and the voiceband. (Technology Information)," *EDN magazine* article as it appears on the FindArticles web site at: www.findarticles.com, Dec. 9, 1999.

"GDSL: GTE selects GoDigital's GDSL–8 access system: GDSL–8 system quickly meets the demand for GTE's added line growth," *EDGE* article as it appears on the FindArticles web site at: www.findarticles.com, Sep. 28, 1998.

"GoDigital Networks Increases reliability of DSL services and extends reach to 25 miles from central office," *PR Newswire* article as it appears on the FindArticles web site at: www.findarticles.com, Oct. 13, 1999.

"GDSL–8: GoDigital Telecommunications, Inc. introduces four line drop flexibility with its GDSL–8 digital replacement system for analog carrier, meeting increased local loop line demand and internet access speeds. (Product Announcement)," *EDGE* article as it appears on the FindArticles web site at: www.findarticles.com, Feb. 8, 1999.

"GoDigital Telecommunications, Inc. introduces long loop high speed internet access support with its GDSL BRI–3 product line," *Business Wire* article as it appears on the FindArticles web site at: www.findarticles.com, Mar. 22, 1999.

"Microfilter design promises peaceful coexistence between ADSL and the voiceband. (Technology Information)," *EDN* article as it appears on the FindArticles web site at: www.findarticles.com, Dec. 9, 1999.

"GoDigital networks adds extended range drops to serve hard–to–reach subscribers," *PR Newswire* article as it appears on the FindArticles web site at: www.findarticles.com, Jan. 18, 2000.

"The next big home networking thing, (Technology Information)," *Home Office Computing* article as it appears on the FindArticles web site at: www.findarticles.com, Mar. 2000.

"Intranets and I–commerce–hotlinks (news briefs)," *InfoWorld* article as it appears on the FindArticles web site at: www.findarticles.com, Mar. 6, 2000.

"The fastest towns in America. (Technology Information)," *Home Office Computing* article as it appears on the FindArticles web site at: www.findarticles.com, Apr. 2000.

"2Wire Inc. (2W HomePortal)," *America's Network* article as it appears on the FindArticles web site at: www.findarticles.com, Jun. 1, 2000.

"Symmetricom's new GoLong solution doubles current reach of ADSL, enabling ADSL everywhere," *Business Wire* article as it appears on the FindArticles web site at: www.findarticles.com, Jun. 7, 2000.

"TriMedia boxes ready soon," *Electronics Times* article as it appears on the FindArticles web site at: www.findarticles.com, Sep. 18, 2000.

"General bandwidth and 2Wire partner to deliver VoDSL solution for the residential market," *Cambridge Telecom Report* article as it appears on the FindArticles web site at: www.findarticles.com, Jun. 5, 2000.

"Office Depot and 2Wire announce strategic retail partnership for leading residential Gateway products," *EDGE: Work–Group Computing Report* article as it appears on the FindArticles web site at: www.findarticles.com, Jun. 5, 2000.

"GoDigital Networks first to introduce line–powered solution for delivering both voice and DSL to any location," *PR Newswire* article as it appears on the FindArticles web site at: www.findarticles.com, Jun. 6, 2000.

"The 39 (Network) Steps. (News Briefs)," *Home Office Computing* article as it appears on the FindArticles web site: www.findarticles.com, Aug. 2000.

"2Wire delivers HomePortal residential Gateway to consumers for ultra–fast internet access and easy home networking," *Business Wire* article as it appears on the FindArticles web site at: www.findarticles.com, Oct. 10, 2000.

"Independent laboratory testing confirms that Symmetricom's GoLong doubles the reach of ADSL services," *Business Wire* article as it appears on the FindArticles web site at: www.findarticles.com, Nov. 7, 2000.

"Chester Telephone doubles the serving distance of its DSL services using Symmetricom's GoLong loop extender; field trials to begin in Chester, S.C. mid–Dec. 2000," *Business Wire* article as it appears on the FindArticles web site at: www.findarticles.com, Dec. 4, 2000.

"Symmetricom's Go–Long loop extender doubles the serving distance of Chester Telephone's DSL services; field trials to begin in Chester, S.C. mid–Dec. 2000," *Business Wire* article as it appears on the FindArticles web site at: www.findarticles.com, Dec. 4, 2000.

"Symmetricom replaces headline in Chester Telephone release; Symmetricom's Go–Long loop extender doubles the serving distance of Chester Telephone's DSL services," *Business Wire* article as it appears on the FindArticles web site at: www.findarticles.com, Dec. 4, 2000.

* cited by examiner

INCREASING GAIN WITH ISOLATING UPSTREAM AND DOWNSTREAM FILTERS AND AMPLIFIERS

BACKGROUND OF THE INVENTION

1. Field of the Invention

The invention relates generally to the field of digital subscriber loops. More particularly, the invention relates to digital subscriber loop repeaters and associated methods.

2. Discussion of the Related Art

Conventional telephony, often called plain old telephone service (POTS), is provided to customers over copper cable. This copper cable can be termed a subscriber loop or a subscriber line. Modern loop plant designs specify the use of 26-gauge cable for short to medium loop lengths with 24-gauge cable used to extend the range. Legacy loop plant includes cable of 22-gauge as well as 19-gauge.

At the customer premises, a telephone set is typically connected to the cable. The other end of the cable is connected to a line circuit module in the service provider's central office (CO). Switches terminating customer loops at the central office are regarded as Class-5 switches and provide a dial-tone. The customer premise equipment (CPE) can include a personal computer (PC) modem.

Older central office switches were analog in nature and were unable to provide a broad range of services. Modern central office switches are digital. Digital switches include codecs in the line circuit to do the bilateral analog-digital (A/D) conversion; the transmission over the loop is analog and the signals occupy a frequency band of up to (approximately) 4 kHz. Conventional telephony codecs convert at an 8 kHz sampling rate and quantize to 8 bits per sample corresponding to a net bit rate of 64 kbps (or "DS0").

With the advent of digital terminal equipment, such as personal computers, modems were developed to carry digital bit streams in an analog format over the cable pair. Because of the 4 kHz constraint imposed by the A/D converter in the line circuit, the data rate of such transmission is limited and is typically 9.6 kbps. More elaborate schemes have been proposed which permit higher bit rates (e.g. V.34 which can do in excess of 28.8 kbps). More recently, there are schemes that "spoof" the D/A converter in the line-circuit operate at bit rates as high as 56 kbps in the downstream direction (from CO to CPE). With increasing deployment of, and consequently demand for, digital services it is clear that this bit rate is insufficient.

An early proposal to increase the information carrying capacity of the subscriber loop was ISDN ("Integrated Services Digital Network"), specifically the BRI ("Basic Rate Interface") which specified a "2B+D" approach where 2 bearer channels and one data channel (hence 2B+D) were transported between the CO and the CPE. Each B channel corresponded to 64 kbps and the D channel carried 16 kbps. With 16 kbps overhead, the loop would have to transport 160 kbps in a full duplex fashion. This was the first notion of a Digital Subscriber Loop ("DSL") (or Digital Subscriber Line). However, this approach presumed that POTS and 2B+D would not coexist (simultaneously). The voice codec would be in the CPE equipment and the "network" would be "all-digital". Most equipment was designed with a "fallback" whereby the POTS line-circuit would be in a "standby" mode and in the event of a problem such as a power failure in the CPE, the handset would be connected to the loop and the conventional line-circuit would take over. There are several ISDN DSLs operational today.[1-2]

Asymmetric digital subscriber loop (ADSL) was proposed to provide a much higher data rate to the customer in a manner that coexisted with POTS. Recognizing that the spectral occupancy of POTS is limited to low frequencies, the higher frequencies could be used to carry data (the so-called Data over Voice approach). Nominally, ADSL proposed that 10 kHz and below would be allocated to POTS and the frequencies above 10 kHz for data. Whereas the nominal ADSL band is above 10 kz, the latest version of the standard specifies that the "useable" frequency range is above 20 kHz. This wide band between 4 kHz and the low edge of the ADSL band simplifies the design of the filters used to segregate the bands.

Furthermore, it was recognized that the downstream data rate requirement is usually much greater than the upstream data rate requirement. Several flavors ("Classes") of ADSL have been standardized, involving different data rates in the two directions. The simplest is Class-4 which provides (North American Standard) 1.536 Mbps in the downstream direction and 160 kbps in the upstream direction. The most complicated, Class-1, provides about 7 Mbps downstream and 700 kbps upstream.[3-4]

A stumbling block in specifying, or guaranteeing, a definite bit rate to a customer is the nature of the loop plant. Customers can be at varied geographical distances from the central office and thus the length of the subscriber loop is variable, ranging from short (hundreds of feet) to long (thousands of feet) to very long (tens of thousands of feet). The essentially lowpass frequency response of subscriber cable limits the usable bandwidth and hence the bit rate.

Moreover, loops longer than (approximately) 18 thousand feet have a lowpass characteristic that even affects the voiceband. Such loops are specially treated by the addition of load coils and are called "loaded loops". The principle is to splice in series-inductors which have the impact of "boosting" the frequency response at (approximately) 4 kHz with the secondary effect of increasing the attenuation beyond 4 kHz very substantially. In these loaded loops, the spectral region above 10 kHz is unusable for reliable transmission. Consequently, the categorical statement can be made that DSL (including ADSL, "2B+D", and other flavors of DSL) cannot be provided over long loops and definitely cannot be provided over loaded loops.

Heretofore, there has not been a satisfactory approach to providing DSL over long loops. Further, there has not been a satisfactory approach to providing DSL over loaded loops. What is needed is a solution that addresses one, or both, of these requirements. The invention is directed to meeting these requirements, among others.

SUMMARY OF THE INVENTION

A goal of the invention is to satisfy the above-discussed requirement of providing DSL over long loops which in the case of the prior art is not satisfied. Another goal of the invention is to satisfy the above-discussed requirement of providing DSL over loaded loops which in the case of the prior art is not satisfied. Another goal of the invention is to satisfy the requirement of providing DSL over loops that are both long and loaded which in the case of the prior art is not satisfied.

The invention is a solution to the problem of providing DSL over long and/or loaded loops. One, or more, digital subscriber loop repeater(s) can permit DSL operation on a long loop. While conventional DSL installation requires that all load coils be removed from a loop, the invention can include the bypassing and/or replacing these load coils with one, or more, digital subscriber loop repeater(s).

One embodiment of the invention is based on a method of transforming a digital subscriber loop signal, comprising: providing the digital subscriber loop signal; and increasing a gain of the digital subscriber loop signal with a digital subscriber loop repeater. Another embodiment of the invention is based on a digital subscriber loop repeater, comprising: an amplifier. Another embodiment of the invention is based on a digital subscriber loop, comprising a digital subscriber loop repeater.

These, and other goals and embodiments of the invention will be better appreciated and understood when considered in conjunction with the following description and the accompanying drawings. It should be understood, however, that the following description, while indicating preferred embodiments of the invention and numerous specific details thereof, is given by way of illustration and not of limitation. Many changes and modifications may be made within the scope of the invention without departing from the spirit thereof, and the invention includes all such modifications.

BRIEF DESCRIPTION OF THE DRAWINGS

A clear conception of the advantages and features constituting the invention, and of the components and operation of model systems provided with the invention, will become more readily apparent by referring to the exemplary, and therefore nonlimiting, embodiments illustrated in the drawings accompanying and forming a part of this specification, wherein like reference characters designate the same parts. It should be noted that the features illustrated in the drawings are not necessarily drawn to scale.

DESCRIPTION OF PREFERRED EMBODIMENTS

Figure 1:
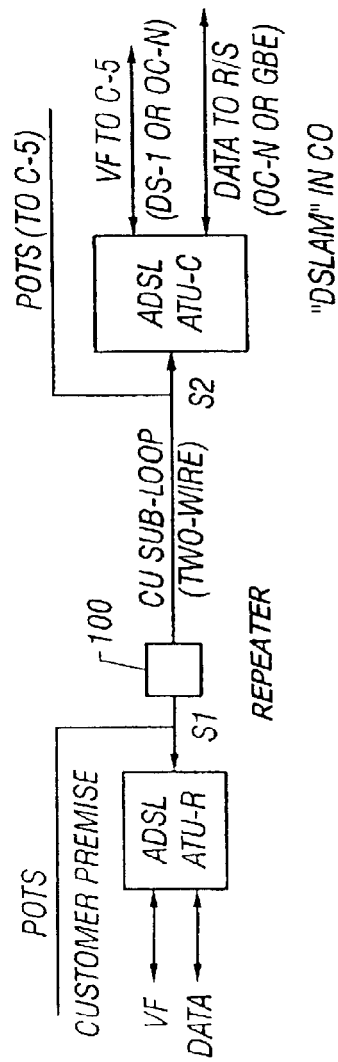
FIG. 1 illustrates a block schematic view of the more important components of an ADSL repeater equipped subscriber loop, representing an embodiment of the invention.

The invention and the various features and advantageous details thereof are explained more fully with reference to the nonlimiting embodiments that are illustrated in the accompanying drawings and detailed in the following description of preferred embodiments. Descriptions of well known components and processing techniques are omitted so as not to unnecessarily obscure the invention in detail.

Within this application several publications are referenced by superscripts composed of Arabic numerals within parentheses. Full citations for these publications may be found at the end of the specification immediately preceding the claims after the section heading References. The disclosures of all these publications in their entireties are hereby expressly incorporated by reference into the present application for the purpose of indicating the background of the invention and illustrating the state of the art.

The context of the invention includes digital subscriber loops. One species of digital subscriber loops is an asymmetrical digital subscriber loop. A preferred embodiment of the invention using ADSL repeaters (in place of load coils) enables a form of ADSL that uses the technique of frequency-division-duplexing to be provided to customers over very long loops.

The agreed upon standard for ADSL is the DMT (Discrete Multi-Tone) method. A premise underlying DMT is that the channel, namely the subscriber loop, does not have a "flat" frequency response. The attenuation at 1 Mhz ("high" frequency) can be as much as 60 dB greater than at 10 kHz ("low" frequency). Furthermore this attenuation varies with the length of the cable. By using Digital Signal Processing ("DSP") techniques, specifically the theory of the Discrete Fourier Transform ("DFT") and Fast Fourier Transform ("FFT") for efficient implementation, the DMT method splits the available frequency band into smaller sub-channels of (approximately) 4 kHz. Each sub-channel is then loaded with a data rate that it can reliably support to give the desired aggregate data rate. Thus lower (center-)frequency sub-channels will normally carry a greater data rate than the sub-channels at higher (center-)frequencies.

The underlying principle of the DSL repeater is the need to combat the loss in the actual cable (subscriber loop). This is achieved by introducing gain. Since amplifiers are for the most part unidirectional devices, one approach is to perform a 2w-to-4w conversion and put amplifiers in each direction. This is most easily achieved when the directions of transmission are in disjoint spectral bands. The direction of transmission are in disjoint spectral bands if the directions of transmission are separated in frequency (i.e. frequency-division duplexing), then simple filter arrangements can provide the separation.

Most loop plant provide for access to the cable, which may be buried underground, approximately every 6000 feet. This was the practice to allow for the provision of load coils. Thus the natural separation between repeaters is (approximately) 6000 feet. The repeater may be placed in parallel with a load coil if the DSL needs to coexist with POTS.

Referring to FIG. 1, a general architecture for providing asymmetric digital subscriber line (ADSL) is depicted. A subscriber loop is the actual two-wire copper pair that originates at the Central Office and terminates at the subscriber's premise. For providing ADSL over long loops, an ADSL repeater, 100, may be included. At the customer premise the handset (POTS) is "bridged" onto the subscriber loop at point labeled S1. In some forms of ADSL this bridging can be achieved using passive filters (called a "splitter") to demarcate the frequency bands where voice and data reside. Similarly, a splitter may be employed at the central office (CO) at point S2. Central office equipment that interfaces to ADSL provisioned lines is often embodied as a multiplexer called a "DSLAM" (Digital Subscriber Line Access Multiplexer). The data component is aggregated into an optical or high-bit-rate signal for transport to the appropriate terminal equipment. The capacity of ADSL allows for additional voice circuits (shown as VF in FIG. 1) to be carried in digital format as part of the ADSL data stream. This content is usually (though not always) destined to a Class-5 switch.

The term approximately, as used herein, is defined as at least close to a given value (e.g., preferably within 0.1% of, more preferably within 1% of, and most preferably within 0.1% of). The term coupled, as used herein, is defined as connected, although not necessarily directly, and not necessarily mechanically. The term substantially, as used herein, is defined as at least approaching a given state (e.g., preferably within 10% of, more preferably within 1% of, and most preferably within 0.1% of).

Given that a large installed loop plant exists, the invention can include retrofit installation. Part of the retrofit installation procedure involves removal of all load coils, and bridge-taps that may be present on the (existing) subscriber loop. Based on telephone company records, the (approximate) distance between the subscriber premise and the serving Central Office can be estimated to decide whether DSL can be provided in the first place. If DSL can indeed be provided, an estimate of the class (and thus the data carrying capacity) is made. If not, then the telephone company may choose to provide a lower bit-rate service such as BRI or, in some cases, not be able to provide any service beyond POTS.

Signals from both directions can coexist on the cable pair and such transmission is referred to as "2-wire". This form is perfectly adequate for analog signals (speech). In digital transmission systems the two directions are separated (logically, if not physically) and such transmission is termed "4-wire". Two common approaches to achieving this action are "echo canceling" and frequency-division-duplexing ("FDD"). Both approaches can be supported by the DMT method.

Figure 2:
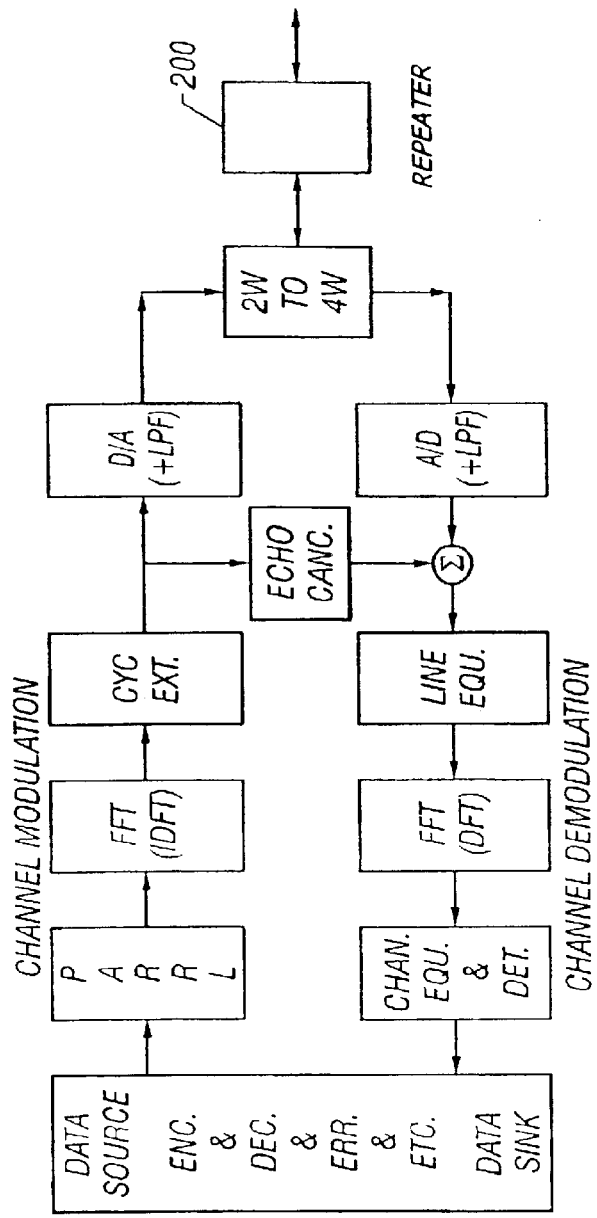
FIG. 2 illustrates a block schematic view of the more important elements of a DMT signal processing flow (echo canceling mode), representing an embodiment of the invention.

Referring to FIG. 2, a signal processing flow in a DMT-based ADSL transmission unit ("ATU") that employs echo cancellation is depicted. The transmit ("modulation" direction) side is considered first. The data to be transmitted is first processed to include error correction by a ENC. & DEC. & ERR. & ETC. unit. It is then formatted into multiple "parallel" channels via a PARRL processing unit. It is then placed in the appropriate frequency slot via a FFT processing unit. The notion of "cyclic extension" is unique to DMT and involves increasing the sampling rate by insertion of additional samples via a CYC. EXT. processing unit. This composite signal is converted to analog via a D/A converter and coupled to the line via a 2w-to-4w converter. An ADSL repeater 200 is coupled to the 2w-to-4w converter.

Ideally the entire signal from the D/A converter is transmitted to the distant end via the 2w-to-4w converter. However, in practice some amount "leaks" from the 2w-to-4w converter toward a A/D converter. This leakage can be termed the "echo."

The receive side ("demodulation" direction) is now considered. The signal from the distant end arrives at the 2w-to-4w converter via the repeater 200 and is directed to the A/D converter for conversion to digital format. Subsequent processing includes line equalization via the LINE EQU. unit, fast Fourier transformation via the FFT unit and then channel equalization and data detection via the CHAN. EQU. & DET. unit. Processing is then handed to the unit that does the error detection and/or correction and reorganizing into the appropriate format. To remove the echo (the component of the transmit signal that leaks across the 2w-to-4w converter) an echo cancellation filter is employed. This is a digital filter that mimics the echo path and thus the output of the filter labeled "Echo Canc" is a "replica" of the echo and by subtraction of this signal from the received signal at a summation unit, the net echo can be substantially reduced. Thus 4w operation is achieved even though the medium is merely 2w. The spectral content of signals in the two directions can have significant overlap but are sufficiently separated by the echo cancellation technique.

Figure 3:
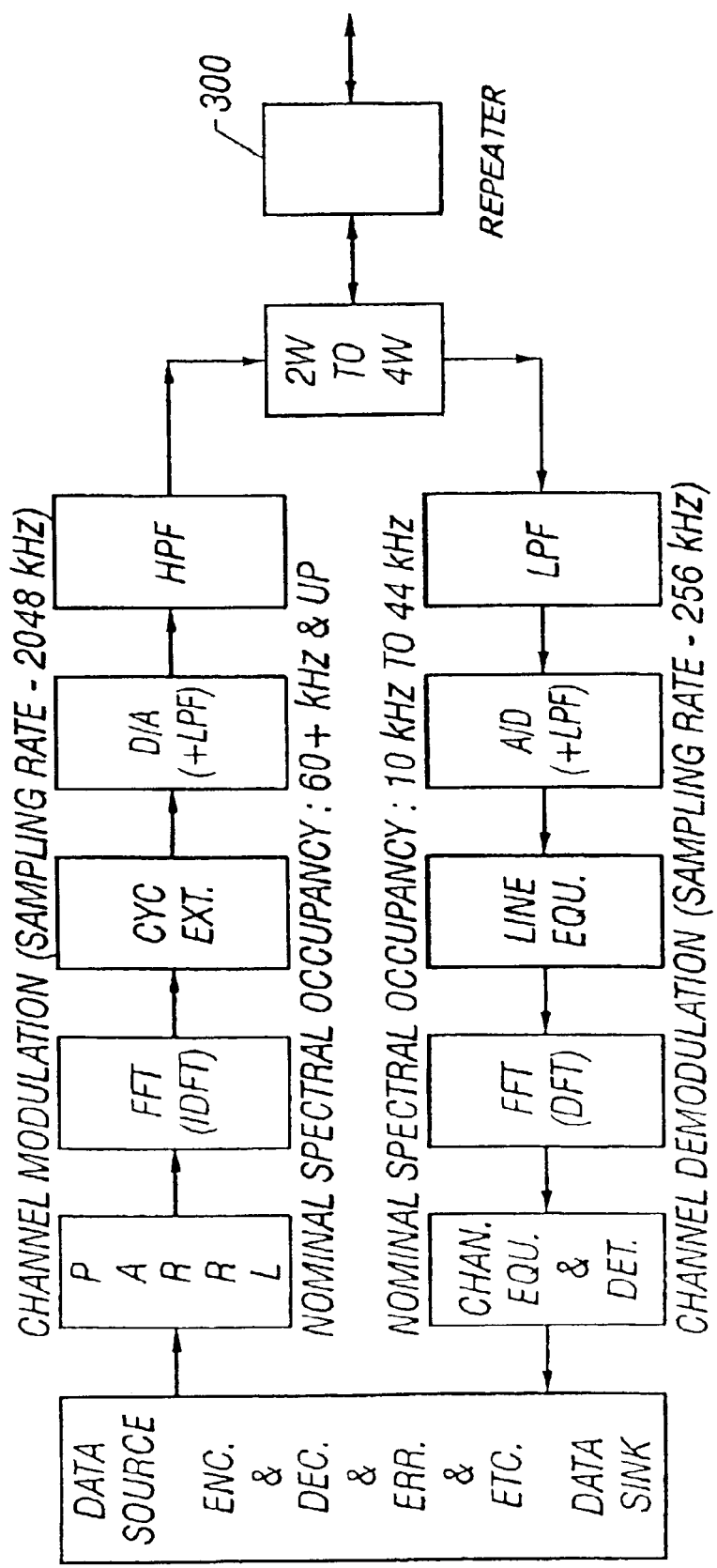
FIG. 3 illustrates a block schematic view of a frequency-division duplexing mode for DMT-based SDSL (central office end shown), representing an embodiment of the invention.

Referring to FIG. 3, a frequency-division duplexing (FDD) mode of DMT for ADSL is depicted. The "back-end" of the FDD version of DMT-based ADSL is substantially the same as the echo-canceling version illustrated in FIG. 2.

Referring again to FIG. 3, the frequency range used for Upstream versus Downstream is vendor specific. Standards-compliant ADSL uses a total bandwidth of roughly 20 kHz to 1.1 MHz. In a preferred embodiment, the upstream occupies between 20 kHz and $X_1$ kHz whereas the downstream signal occupies the band between $X_2$ kHz and 1.1 MHz. $X_2$ should be substantially greater than $X_1$ to allow for frequency roll-off of the filters used to demarcate the upstream and down-stream bands. One suitable choice is $X_1$=80 kHz and $X_2$=160 kHz. The specific choice of these band edges can be made a design parameter and different "models" of the repeater can be fabricated with different choices of band edges.

Still referring to FIG. 3, a high pass filter HPF unit is coupled to the D/A units. A 2w-to-4w converter is coupled to the HPF unit. The 2w-to-4w converter is also coupled to a low pass filter LPF unit which is in-turn coupled to the A/D unit. An ADSL repeater 300 is coupled to the 2W-to-4w converter.

The invention can also utilize data processing methods that transform signals from the digital subscriber line to actuate interconnected discrete hardware elements. For example, to remotely fine-tuned (gain adjustment and/or band-pass adjustment) and/or reconfigured (downstream/upstream reallocation) after initial installation using on network control signals sent over the DSL.

The invention can also be included in a kit. The kit can include some, or all, of the components that compose the invention. More specifically, the kit can include instructions for practicing the invention and apparatus for carrying out the invention. Unless otherwise specified, the components (and apparatus and/or instructions) of the kit can be the same as those used in the invention.

EXAMPLE

A specific embodiment of the invention will now be further described by the following, nonlimiting example which will serve to illustrate in some detail various features of significance. The example is intended merely to facilitate an understanding of ways in which the invention may be practiced and to further enable those of skill in the art to practice the invention. Accordingly, the example should not be construed as limiting the scope of the invention.

The particular description of an ADSL Repeater provided in this example is suitable for the DMT-based ADSL transmission scheme employing frequency-division duplexing (FDD). The form discussed assumes that POTS and ADSL will coexist (simultaneously). Of course, the invention is not limited to this ADSL FDD example.

Figure 4:
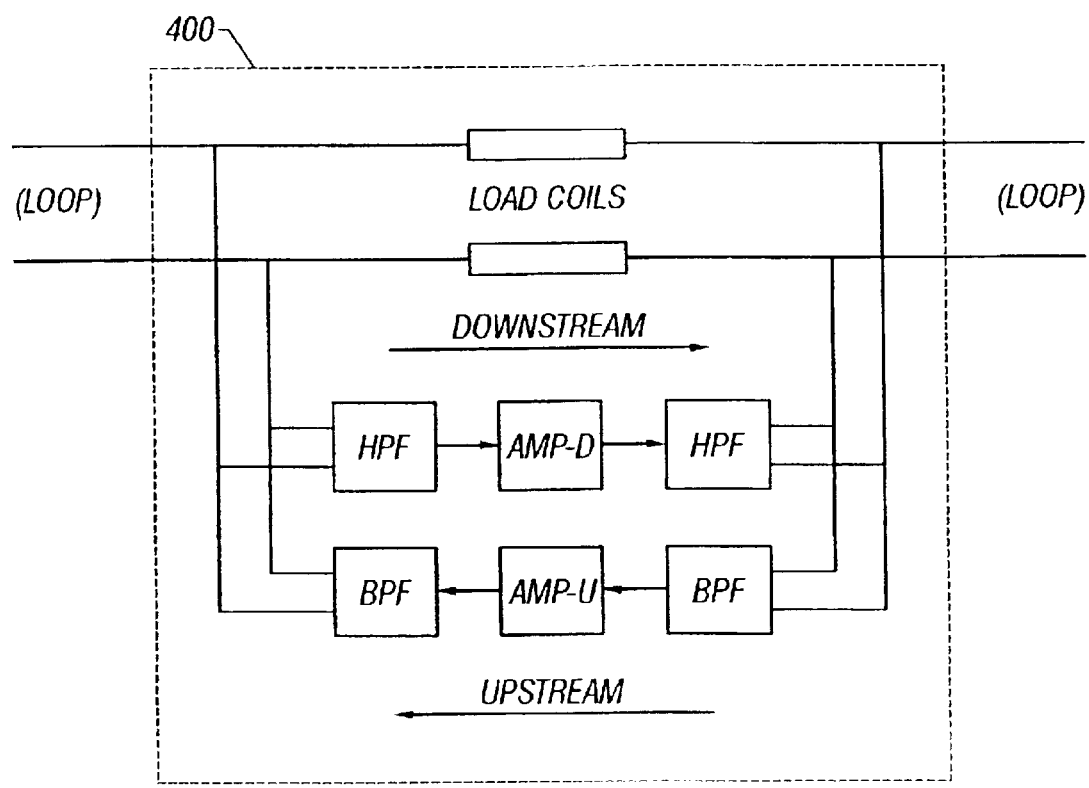
FIG. 4 illustrates a block schematic view of an exemplary asymmetric digital subscriber loop repeater, representing an embodiment of the invention.

Referring to FIG. 4, an outline of the functional blocks in an ADSL repeater 400 are depicted. For convenience certain functions such as power and control are not shown in FIG. 4. Power and control units can be coupled to the ADSL repeater 400. Although not required, two load coils are shown as part of the repeater 400. When load coils are deployed in a loop, the loop is split and the load coils are spliced in as indicated by the series connections of the inductors (load coils) with the loop. This can be termed in line with loop.

The load coils provide a very high impedance at high frequencies and thus for the range of frequencies where ADSL operates the load coils look essentially like open circuits. The 2w-to-4w arrangement is not explicitly shown in FIG. 4 but is implied. Since the two directions are separated in frequency, the 2w-to-4w arrangement can be quite simple. A bandpass filter BPF isolates the frequency band from 10 kHz to 44 kHz (approximately) and thus the upstream signal is amplified by an amplifier AMP-U. In this particular example, the gain introduced can compensate for the attenuation introduced by approximately 6000 feet of cable at 27 kHz (or approximately the middle of the band). The highpass filters HPF separates out the band above 60 kHz (approximately) and thus the downstream signal is amplified by an amplifier AMP-D. Again, in this particular example, the gain introduced compensates for the attenuation of approximately 6000 feet of cable at 600 kHz (again, roughly the middle of the band).

Since the frequency response of the cable is not "flat" the amplifiers can be designed such that, in conjunction with the filters, they provide a rough amplitude equalization of the cable response over the appropriate frequency band, for example, approximately 10 kHz to 44 kHz upstream and approximately 60 kHz to 1 MHz downstream. The choice of frequency bands is, preferably, 20 kHz to 80 kHz for the upstream direction and 160 kHz to 1.1 MHz for the downstream direction.

An ADSL Repeater is well suited for providing ADSL services over long loops which may have been precluded based on loop length and presence of load coils. As described it is a simple mechanism for amplifying the upstream and downstream signals, compensating for the loss in the subscriber loop cable. Separating repeaters by approximately 6000 feet is appropriate since this the nominal distance between points on the cable where load coils were introduced in the past. Cross-over networks based on highpass and bandpass filters can define the upstream and downstream bandwidths used by the DMT-based ADSL units at the CO and CPE operating in a frequency division duplex mode.

Installing equipment in the cable plant introduces two important considerations. One is the need to provide power. The second is to provide the means to verify operation and isolate problems.

Subscriber loop cable usually comes in bundles of 25 pairs. That is each bundle can provide service to 25 telephone lines. One embodiment of the invention can use the 25 pairs to provide just 20 ADSL connections. This leaves 4 pairs to carry power for the repeaters, and 1 pair to carry control information.

Each 25-pair "repeater housing" can include one controller (microprocessor) and modems that convert the digital control information to (and from) analog for transport over the control pair. These controllers can operate in "daisy chain" which allows the central office end to query for status, or control the operation of, any repeater housing in the path. For long loops, those exceeding 18 thousand feet, there may be as many as 4 or 5 (or more) repeater housings connected in series (approximately 6000 feet apart). The control information will include commands for maintenance and provisioning information.

The provisioning information relates to the mode of operation of each of the 20 pair of cable that carry ADSL. One mode is "normal", where the repeater is operating and the load coils are in the circuit. Another mode is "no-ADSL-repeater" wherein the repeaters are not part of the circuit. This latter w mode has two "sub-modes". The load-coils may be in the circuit or be removed. The last sub-mode is appropriate if the loop is actually short and we do not need the repeaters and the load coils need to be removed. Of course, other modes of operation can be conceived of.

For test and maintenance purposes, the central office end needs to be capable of forcing any one chosen repeater (on the subscriber loop under test) to enter a loop-back state. That is, a test signal sent from the central office is "looped back" at the chosen repeater and the condition of the loop up to that chosen repeater can be validated. Other test and maintenance features must be provided to support the operating procedures of the phone company.

For providing loop-back through the repeater, the following approach can be used. It can be appreciated that the upstream and downstream signal bands are disparate and non-overlapping. Thus, the notion of loop-back is not simple. One approach can use a two-tone test signal that is within the downstream spectral band. For example, the tone frequencies could be 200 kHz and 250 kHz. When commanded to go into loop-back, the designated repeater introduces a nonlinear element into the circuit. The nonlinear element will create different combinations of the sums and difference frequencies. In particular, the nonlinear element can generate the difference frequency, 50 kHz in the example cited. This signal is within the frequency band of the upstream direction and thus can be looped back. The Central Office end can monitor the upstream path for this (difference) frequency and thus validate the connectivity up to the repeater in loop-back state.

PRACTICAL APPLICATIONS OF THE INVENTION

A practical application of the invention that has value within the 4; technological arts is local digital subscriber loop service. Further, the invention is useful in conjunction with digital subscriber loop networks (such as are used for the purpose of local area networks or wide area networks), or the like. There are virtually innumerable uses for the invention, all of which need not be detailed here.

ADVANTAGES OF THE INVENTION

A digital subscriber loop repeater, representing an embodiment of the invention, can be cost effective and advantageous for at least the following reasons. The invention permits DSL to be provided on long loops. The invention permits DSL to be provided on loaded loops.

All the disclosed embodiments of the invention described herein can be realized and practiced without undue experimentation. Although the best mode of carrying out the invention contemplated by the inventors is disclosed above, practice of the invention is not limited thereto. Accordingly, it will be appreciated by those skilled in the art that the invention may be practiced otherwise than as specifically described herein.

For example, the individual components need not be formed in the disclosed shapes, or assembled in the disclosed configuration, but could be provided in virtually any shape, and assembled in virtually any configuration. Further, although the digital subscriber loop repeater described herein can be a physically separate module, it will be manifest that the digital subscriber loop repeater may be integrated into the apparatus with which it is associated. Furthermore, all the disclosed elements and features of each disclosed embodiment can be combined with, or substituted for, the disclosed elements and features of every other disclosed embodiment except where such elements or features are mutually exclusive.

It will be manifest that various additions, modifications and rearrangements of the features of the invention may be made without deviating from the spirit and scope of the underlying inventive concept. It is intended that the scope of the invention as defined by the appended claims and their equivalents cover all such additions, modifications, and rearrangements.

The appended claims are not to be interpreted as including means-plus-function limitations, unless such a limitation is explicitly recited in a given claim using the phrase "means for." expedient embodiments of the invention are differentiated by the appended subclaims:

REFERENCES

1 Walter Y. Chen, *DSL. Simulation Techniques and Standards Development for Digital Subscriber Line Systems*, Macmillan Technical Publishing, Indianapolis, 1998. ISBN-1-57870-017-5.
2 Padmanand Warrier and Balaji Kumar, *XDSL Architecture*, McGraw-Hill, 1999. ISBN: 0-07-135006-3.
3 "G.992.1, Asymmetrical Digital Subscriber Line (ADSL) Transceivers," Draft ITU Recommendation, COM 15-131.
4 "G.992.2, Splitterless Asymmetrical Digital Subscriber Line (ADSL) Transceivers," Draft ITU Recommendation COM 15-136.

What is claimed is:

1. A method of transforming a digital subscriber loop signal, comprising:
   providing the digital subscriber loop signal;
   increasing a gain of the digital subscriber loop signal with a digital subscriber loop repeater; and
   querying the digital subscriber loop repeater for a purpose selected from the group consisting of controlling the operation of the digital subscriber loop repeater and determining the status of the digital subscriber loop repeater,
   wherein controlling the operation of the digital subscriber loop repeater includes provisioning the digital subscriber loop repeater with an operational mode selected from the group consisting of normal, no-ADSL-repeater with coils in circuit, and no-ADSL-repeater with coils out of circuit.

2. The method of claim 1, wherein increasing gain includes increasing gain with an asymmetrical digital subscriber loop repeater.

3. The method of claim 1, further comprising processing the digital subscriber loop signal with an echo cancellation filter.

4. The method of claim 1, further comprising frequency division duplexing.

5. The method of claim 4, wherein frequency division duplexing includes passing the digital subscriber loop signal through a low pass filter after increasing the gain of the digital subscriber loop signal.

6. The method of claim 1, further comprising remotely fine-tuning the digital subscriber loop repeater using control signals sent to the digital subscriber loop repeater.

7. The method of claim 1, further comprising remotely reconfiguring the digital subscriber loop repeater using control signals sent to the digital subscriber loop repeater.

8. The method of claim 1, wherein querying the digital subscriber loop repeater includes maintaining the digital subscriber loop repeater by causing the digital subscriber loop repeater to enter into a loop-back state.

* * * * *